United States Patent [19]

Chang et al.

[11] 4,157,960
[45] Jun. 12, 1979

[54] METHOD FOR ENHANCING MEMBRANE SEPARATION

[75] Inventors: Richard C. Chang, Raleigh; Robert R. Ward, Cary, both of N.C.

[73] Assignee: Monsanto Company, St. Louis, Mo.

[21] Appl. No.: 855,852

[22] Filed: Nov. 30, 1977

[51] Int. Cl.² .............................................. B01D 13/00
[52] U.S. Cl. .............................. 210/23 R; 210/500 M; 55/16; 55/158; 264/41
[58] Field of Search ................. 264/41; 210/22, 23 R, 210/23 F, 321, 500 M, 2, 7, 12, 15, 17; 55/16, 158

[56] References Cited

U.S. PATENT DOCUMENTS

| 3,398,088 | 8/1968 | Okey | 210/7 X |
| 3,472,765 | 10/1969 | Budd et al. | 210/23 F X |
| 3,615,024 | 10/1971 | Michaels | 210/321 R |
| 3,703,570 | 11/1972 | Busch et al. | 210/500 M X |

*Primary Examiner*—Ferris H. Lander
*Attorney, Agent, or Firm*—Norman L. Balmer; Howard C. Stanley; James W. Williams, Jr.

[57] ABSTRACT

The selectivities of fluid separations of membranes having pores, in which the material of the membranes significantly effects the fluid separations, can be enhanced by the storage of the membranes in water. Suitable materials of the membranes for improvement in accordance with this invention are those which are not unduly susceptible to biodegradation. The membranes for improvement in accordance with this invention preferably have structures which are not unduly affected by drying and thus maintain beneficial mechanical and fluid separation properties after drying.

25 Claims, No Drawings

METHOD FOR ENHANCING MEMBRANE SEPARATION

This invention pertains to methods for enhancing the performance of semi-permeable membranes suitable for fluid separations, e.g., by the selective permeation of at least one fluid in a fluid mixture over that of one or more fluids of the mixture.

The separation of at least one fluid in a fluid mixture from one or more remaining fluids can be conducted by selective permeation of at least one fluid through a semi-permeable membrane. In order to be attractive, the semi-permeable membranes should exhibit not only adequate selectivities of separation of fluids from fluid mixtures, but also the flux rates of the separated fluids through the semi-permeable membranes should be sufficiently fast that unduly large membrane surface areas, and hence, large and costly separation installations, are not required. Moreover, the semi-permeable membranes must be able to withstand the conditions to which they are subjected during the fluid separation operations.

According to current theories, fluid separations through semi-permeable membranes may be by several mechanisms. One group of such mechanisms include ultrafiltration, Knudsen flow or diffusion, and the like which are primarily dependent on the size and character of pores (i.e., continuous channels for fluid flow in communication with both the feed and exit surfaces of the membrane) in the membrane. In another postulated mechanism for fluid separations the passage of a fluid through the membrane may be by interaction of the fluid with the material of the membrane. With respect to this latter-mentioned mechanism, it is believed that the selectivity of the fluid separation is improved as the semi-permeable membrane has fewer pores which pores enable fluid flow across the membrane with little, if any, separation. Unfortunately, in order to obtain semi-permeable membranes having relatively few pores, the thickness of the membrane is generally increased which undesirably results in a decrease in the flux of the permeate through the membrane.

Heretofore, various proposals have been made in attempts to provide semi-permeable membranes for fluid separations which are competitive in terms of capital and operating expense as well as operability, with other separation techniques including distillation, cyclic adsorption or absorption procedures, and selective condensation. Generally, to obtain the desired, high selectivity of separation, the separation is effected by the material of the membranes as opposed to the pores in the membranes. Accordingly, in order to provide acceptable fluxes efforts have been directed to decreasing the thickness of the material of the membrane through which a permeating fluid must pass. The membrane, however, must be suitably strong to withstand fluid separating conditions. These efforts have included the use of an ultrathin, substantially pore free membrane which is supported on a highly porous support which offers little resistance to the passage of a permeating fluid. Another approach has involved the preparation of semi-permeable membranes which have a relatively porous structure with an integral, thin layer which is relatively dense in fluid flow barrier relationship within the thickness of the membrane. These membranes are generally referred to as anisotropic membranes. Frequently, a barrier is adjacent at least one surface of an anisotropic membrane.

In membranes in which the fluid separations are significantly effected by interaction of the permeating fluid with the material of the membrane, the presence of pores through the barrier layer may drastically adversely affect the separation capabilities of the membranes. In order to mitigate the detrimental effect of the pores on the selectivity of separation, coatings may be provided on these membranes such that the proportion of passage of a permeating fluid through the material of the membranes to the passage of this fluid through the pores is increased with respect to that proportion using the uncoated membranes. Suitable coatings do not significantly effect the separation and can exhibit relatively high permeation rates. The use of such coatings is particularly beneficial for the separations of at least one gas in a mixture of gases from one or more remaining gases as disclosed by Henis, et al, in U.S. patent application Ser. No. 742,159, filed Nov. 15, 1976, now abandoned and Ser. No. 832,481, filed Sept. 13, 1977, both of which are herein incorporated by reference. Even employing such coatings, although the effect of the pores on the selectivity of fluid separations may be mitigated, the pores can still affect adversely the selectivity of separation exhibited by the membranes.

Especially with respect to anisotropic membranes, interest is therefore directed to providing membranes having desirably thin, relatively dense barrier layers such that high fluxes can be obtained, yet the barrier layers have relatively few pores. The character, including porosity, of the relatively dense barrier layer of an anisotropic membrane may be established by numerous factors such as the conditions employed in making the anisotropic membrane and conditions or treatments subsequent to the formation of the anisotropic membrane. For instance, as disclosed by Michaels in U.S. Pat. No. 3,615,024, issued Oct. 26, 1971, the porosity of an anisotropic polymeric membrane (for ultrafiltration or reverse osmosis through the pores of the membrane) prepared by coagulation can be influenced by the concentration of the polymer in the solution for coagulation and the rate of coagulation. Frequently, however, the anisotropic membrane-forming conditions which tend to produce fewer pores through the barrier layer also tend to increase the thickness of the barrier layer. After coagulation to form the membrane, the barrier layer may also be affected by the conditions of drying such as temperature and relative humidity. Anisotropic membranes may be subjected to annealing with or without the presence of a liquid, or subjected to a chemical treatment, to densify at least the barrier layer of the membrane to reduce the number of pores, but this densification can significantly reduce the permeate flux through the membranes.

Generally, it has been found that the most desirable combination of fluxes and selective separations exhibited by anisotropic membranes in which the material of the membranes significantly effects the separation are obtained when the anisotropic membranes are prepared, prior to drying, to have a significant, but not unduly large, porosity and a very thin barrier layer. Since the use of drying conditions or annealing or chemical treatments to further reduce the effect of the pores essentially always results in an apparent increase in the thickness of the barrier layer, other methods are sought as alternatives or supplements to these procedures for increasing the selectivity of separations exhibited by anisotropic membranes without unduly reducing the fluxes of the membranes.

Anisotropic membranes which have been suggested for fluid separations include membranes comprised of cellulose acetate and polyacrylonitrile. In general, many cellulose acetate and polyacrylonitrile membranes have structures which are irreversibly compacted upon drying. This compacting results in substantial decreases in fluxes, and accordingly such structure membranes have been stored and used for fluid separations in a wet condition to avoid compacting of the membranes. Especially with cellulose acetate membranes, biocides have been provided in the storage water to void biodegradation of the membrane. See, for instance, *Development of Storage Techniques for Reverse Osmosis Membranes,* U.S. Department of the Interior, Office of Saline Water, Research and Development Report No. 673 (1971).

By this invention we have surprisingly found that polymeric membranes which are not unduly biodegradable can be stored in aqueous media at temperatures below those required for annealing the material of the membranes to provide enhanced selectivities of fluid separations. The membranes which are particularly advantageous in the methods of this invention are comprised of materials suitable for effecting fluid separations, particularly the separation of at least one gas of a gaseous mixture from one or more remaining gases in the gaseous mixture, and have pores which adversely affect the selectivity of the fluid separations. The pores are sufficiently small in cross-sectional diameter and in number that an adequate surface area of the membrane is provided for conducting fluid separations. Although frequently the membranes may be coated with a material which does not significantly effect the fluid separations but does enhance the selectivity of the fluid separations, the membranes treated in accordance with this invention still can exhibit an increase in selectivity of fluid separations as compared to similarly coated membranes which were not treated in accordance with this invention. Preferably, the membranes are not unduly adversely affected by drying and thus maintain beneficial mechanical and fluid separation properties after drying, i.e., are not unduly compacted so as to lose their structures.

In accordance with this invention, membranes are immersed in water for a period of time sufficient to increase their selectivity of fluid separations. Especially with respect to coagulation-formed anisotropic membranes in which water is a non-solvent, the anisotropic membranes are stored prior to drying due to the frequent difficulty in rewetting the anisotropic membranes. Often, an improvement in selectivity of fluid separations can be observed after one or two days storage in the water, and storage durations of over one year can be employed. However, little, if any, further improvements in selectivity of fluid separations can be observed after about 30 days storage. Accordingly, the duration of storage of the anisotropic membranes in water is usually about 1 to 30, say, about 1 or 5 to 25, days. The storage is generally conducted at ambient conditions, e.g., temperatures of about 10° to 40° C., preferably about 15° to 35° C.

In conducting the treatments of membranes in accordance with this invention, growths of microorganisms in the storage vessel have been observed. The presence of the microorganisms appears to influence the performance of the membranes. In the storage of the membranes in the water which contains biocidal materials in amounts sufficient to sterilize the water, the improvement in selectivities of fluid separations by the membranes is generally not observed. In some treatments, the water which is employed is tap water (e.g., as obtained from the City of Durham, N.C.), the storage is conducted in vessels having loose fitting lids, and no purposeful innoculation of the water with particular microorganisms is made. The microorganisms present appear to vary widely within the storage vessels and from storage vessel to storage vessel and are generally identified as bacteria. Analyses of the storage water indicated that among the identifiable microorganism species are Acinetobacter, Calcoaceticus, Pseudomonas species, *Yersinia Entercolitica, Mima polymorpha.* Not all of these species were found in each vessel of storage medium. Increased microorganism growths are observed when air is bubbled through the water during storage of the membranes. Also, greater microorganism growths are observed when water from the storage of membranes is reused for the storage of additional membranes. Even if the membranes are sprayed with water after storage to remove deposits, the membranes still exhibit enhanced selectivities of fluid separations.

Accordingly, it is preferred that the storage media be essentially bacteriostat-free, i.e., the storage media are essentially free from agents which inhibit the growth of bacteria (bacteriostats) or which kill bacteria (bacteriocides). The presence of an algicide which does not significantly inhibit the growth of bacteria can be tolerated in the storage media for obtaining an enhanced selectivity of separation. A source of many of the microorganisms which have been observed appears to be through airborne contamination. However, little control can be exercised over the types of microorganisms which may be present in the storage media if airborne contamination is employed to inoculate the storage media. Therefore, it is preferred to inoculate the storage media with a known inoculum. Preferably, the inoculum contains essentially non-pathogenic microorganisms, and the microorganisms are capable of growth when attached to the membrane. Suitable inocula may be obtained from microorganism growths in storage media which were previously employed for storage of membranes or from substantially uncontaminated cultures of isolated microorganisms which have been found effective for enhancing the selectivity of separation of membranes. Typical microorganisms which may find application in the methods of this invention include species of Pseudomonadaceae, Achromobacteraceae, Enterobacteriaceae, and Clostridium, and *Bacillus subtillis,* many of which are found in the environment and are substantially non-pathogenic to animals.

The storage media preferably contains nutrients for bacterial growth. While the material of the membrane may contain, e.g., carbon and nitrogen, the material of the membrane may not be a significant available source of, e.g., carbon and nitrogen due to its low susceptibility to biodegradation. Accordingly, other sources of carbon and nitrogen which are available for bacterial growth can be provided in the aqueous media. Suitable sources include conventional carbohydrate- and amino acid-containing materials. Several of the solvents which may be employed in preparing the membranes, e.g., by coagulation from a solution of the polymer, may contain available sources of essential nutrients for bacterial growth. Solvents which have found application in enabling microorganism growth include dimethylformamide, dimethylacetamide, N-methylpyrrolidone, and the like. Other essential inorganic elements for microorganism growths such as calcium, phosphorous, and the like are often supplied in sufficient quantities in tap water. The aqueous media during storage of the membranes may be agitated or otherwise have air or an oxygen-providing material provided; however, the benefits of this invention have been observed when the storage media have been stagnant.

After storage of the membrane it has been found particularly desirable to arrest the growth of microorganisms in order to enable long term storage of the membranes and to enable the use of the membranes without undue risk of contamination of the feed or permeate streams. Any suitable method for arresting microorganism growth may be employed. For instance, a biocide can be added to an aqueous medium containing the membrane. An often convenient method for arresting microorganism growth is by drying the membrane under drying conditions which do not unduly deleteriously affect the membrane. Typical drying conditions include temperatures of about $-20°$ to $100°$ C., say, about $0°$ to $90°$ C., and relative humidities of about 5 to 95, often about 40 to 60 percent. The membranes are often rinsed prior to drying.

The membranes treated in accordance with this invention to improve the selectivity of separation of the membranes may be in any suitable form for fluid separations, e.g., in film or hollow fiber forms. It has been found that the membranes can be in convenient configurations for storage. For instance, when in hollow fiber form, the membranes may be stored in water while tightly wound on bobbins. Advantageously, the membranes have a relatively thin barrier layer which effects the fluid separation. This barrier layer may be a thin or ultrathin membrane which may be supported by a separately formed, porous support. Generally, the thin membranes have thicknesses less than about 2000 or 3000 angstroms. The thicknesses of ultrathin membranes may be as low as monomolecular thicknesses. The thin membranes may be formed in any suitable manner, and disclosures of several techniques for forming the thin membranes are found in U.S. Pat. Nos. 3,580,841; 3,874,986; 3,892,665; and 3,926,798. Alternatively, the relatively thin layer may be provided by anisotropic membranes. Anisotropic membranes are chemically homogeneous and have at least one relatively dense region in barrier relationship to fluid flow across the membrane. Advantageously, this barrier layer is formed to be thin such that permeating fluids need not pass through undue thicknesses of membrane material which reduce the flux of the permeating fluid through the membrane. Since the thicknesses of barrier layers in these anisotropic membranes are extremely small and often no distinct demarcation exists between the barrier layer and the underlying portions of the membrane, no suitable means is presently available for directly measuring the thicknesses of barrier layers. Moreover, the use of different techniques or different polymers in forming anisotropic membranes may significantly affect the thinnesses of the barrier layers which can be obtained. Accordingly, the thickness of the barrier layers of the anisotropic membranes treated in accordance with this invention may vary widely.

The membranes, i.e., the thin membranes or anisotropic membranes, may be formed such that the barrier layer is so thin that flaws exist in the barrier layer. Desirably, the flaws comprise a small portion of the total surface area of the membrane such that adequate surface areas of material of the membranes are provided in the barrier layers for effecting the fluid separations. The ratio of total surface area to total pore cross-sectional area is often at least about 10:1, say, at least about $10^3:1$ up to about $10^{12}:1$, preferably about $10^3:1$ to $10^8:1$. The flaws, or pores, in the barrier layers preferably have major cross-sectional dimensions which are relatively small. Frequently, the pore cross-sectional diameter is less than about 20,000 angstroms, preferably less than about 5000 angstroms, and in some membranes less than about 1000, say, about 5 to 500, angstroms. In some instances, the pores are of such small cross-sectional diameters that the membranes exhibit selectivities of fluid separations characteristic of separations by Knudsen diffusion or by a combination of Knudsen diffusion and separation by interaction of the permeating fluid and the material of the membrane.

Among the membranes (isotropic or anisotropic) which can be treated in accordance with this invention are those having a significant void volume in order to enable relatively rapid passage of the permeating fluid through the portions of the membranes other than the relatively dense barrier layers. Voids are regions within a membrane which are vacant of the material of the membrane. Thus, when voids are present, the density of the membrane is less than the density of the bulk material of the membrane. Generally the void volume is at least about 5 or 10 percent and may be up to about 90 percent, based on the superficial volume, i.e., the volume contained within the gross dimensions, of the walls of the membrane. Frequently, the void volume is about 20 or 30 to 70 or 80 percent. One method for determining the void volume of void-containing membrane is by a density comparison with a volume of the bulk material of the membrane which volume would correspond to a membrane of the same gross physical dimensions and configuration of the membrane. Advantageously, the void-containing membrane, most frequently, an anisotropic membrane, is sufficiently thick that no special apparatus is required for its handling. Frequently the thickness of the void-containing membrane is about 20 to 500, say, about 50 to 200 or 300, microns. When the void-containing membrane is in the form of a hollow fiber, the fiber may often have an outside diameter of about 50 to 1000, say, about 200 to 800, microns and wall thicknesses of about 20 or 50 to 200 or 300 microns.

Anisotropic membranes may be formed by any suitable procedure. Most frequently anisotropic membranes are prepared by dissolving the material for preparing the anisotropic membrane in a solvent and then contacting the material, when in a desired form, with a non-solvent for the material to coagulate the material. Generally, the solution of the material contains about 10 to 40 weight percent solids. The solvent employed depends, in part, upon its ability to dissolve the material for preparing the anisotropic membrane. For many polymeric materials, the solvent may comprise dimethylformamide, N-methylpyrrolidone, dimethylacetamide, cyclohexanone, dimethylsulfoxide, dimethylpropionamide, tetrahydrothiophene, n-butyrolactone, ethylene carbonate, and the like. The formation of the anisotropic membranes may be, for instance, by casting on a support, e.g., a temporary glass substrate, or by spinning into a coagulation bath. The coagulation of the material may be at any suitable temperature, e.g., about $-15°$ to $90°$ C. or more, and is most often about $1°$ to $35°$ C., say, about $2°$ to $10°$ or $20°$ C. The coagulant may vary widely depending upon the material for forming the anisotropic membrane and the coagulation system. The coagulant may be liquid or gaseous. In many instances the coagulant comprises water. After coagulation, the anisotropic membrane is generally washed to remove solvent.

The preferred materials for the membranes absorb relatively little water, e.g., the material absorbs less than about 10, preferably less than about 5, weight percent moisture at 100 percent relative humidity at 25° C. Typical polymers suitable for the membranes suitable for treatment according to the invention, which exhibit low susceptibility to biodegradation, can be substituted or unsubstituted polymers and may be selected from polysulfones; poly(styrenes), including styrene-containing copolymers such as acrylonitrile-styrene copolymers, styrene-butadiene copolymers and styrene-vinyl-benzylhalide copolymers; polycarbonates; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyacrylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The selection of the material for forming the membrane may be made on the basis of the heat resistance, solvent resistance, and mechanical strength of the membrane, as well as other factors dictated by the operating conditions for selective fluid permeation.

One of the preferred polymers utilized in forming the membranes, particularly anisotropic membranes, for treatment accordance with this invention comprises polysulfone. Among the polysulfones which may be utilized are those having a polymeric backbone comprised of the repeating structural unit:

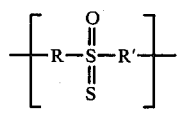

where R and R' can be the same or different and are aliphatic or aromatic hydrocarbyl-containing moieties, say, of 1 to about 40 carbon atoms, wherein the sulfur in the sulfonyl group is bonded to aliphatic or aromatic carbon atoms, and the polysulfone has an average molecular weight suitable for film or fiber formation, often at least about 8000 or 10,000. When the polysulfone is not cross-linked, the molecular weight of the polysulfone is generally less than about 500,000, and is frequently less than about 100,000. The repeating units may be bonded, i.e., R and R' may be bonded, by carbon to carbon bonds or through various linking groups such as

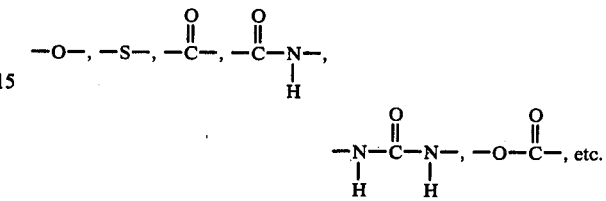

Particularly advantageous polysulfones are those in which at least one of R and R' comprises an aromatic hydrocarbyl-containing moiety and the sulfonyl moiety is bonded to at least one aromatic carbon atom. Common aromatic hydrocarbyl-containing moieties comprise phenylene and substituted phenylene moieties; bisphenyl and substituted bisphenyl moieties, bisphenyl methane and substituted bisphenyl methane moieties having the nucleus

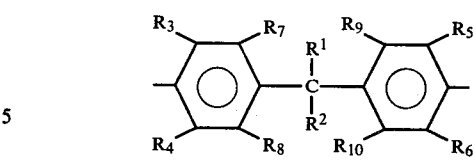

substituted and unsubstituted bisphenyl ethers of formula

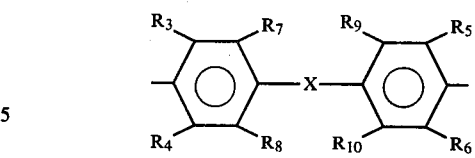

wherein X is oxygen or sulfur; and the like. In the depicted bisphenyl methane and bisphenyl ether moieties $R_1$ to $R_{10}$ represent substituents which may be the same or different and have the structure

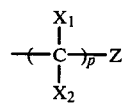

wherein $X_1$ and $X_2$ are the same or different and are hydrogen or halogen (e.g., fluorine, chlorine, and bromine); p is 0 or an integer, e.g., of 1 to about 6; and Z is hydrogen, halogen (e.g., fluorine, chlorine and bromine), $-(Y)_q-R_{11}$ (in which q is 0 or 1, Y is —O—, —S—, —SS—,

and $R_{11}$ is hydrogen, substituted or unsubstituted alkyl, say, of 1 to about 8 carbon atoms, or substituted or unsubstituted aryl, say, monocyclic or bicyclic of about 6 to 15 carbon atoms), heterocyclic with the heteroatom being at least one of nitrogen, oxygen and sulfur and being monocyclic or bicyclic with about 5 to 15 ring atoms, sulfato and sulfono, especially lower alkyl-containing or monocyclic or bicyclic aryl-containing sulfato or sulfono, phosphorous-containing moieties such as phosphino and phosphato and phosphono, especially lower alkyl-containing or monocyclic or bicyclic aryl-containing phosphato or phosphono, amine including primary, secondary, tertiary and quaternary amines often containing lower alkyl or monocyclic or bicyclic aryl moieties, isothioureyl, thioureyl, guanidyl, trialkylsilyl, trialkylstannyl, trialkylplumbyl, dialkylstibinyl, etc. Frequently, the substituents on the phenylene groups of the bisphenyl methane and bisphenyl ether moieties are not provided at the ortho position, i.e., $R_7$ or $R_{10}$ are hydrogen. The polysulfones having aromatic hydrocarbyl-containing moieties in general possess good thermal stability, are resistant to chemical attack, and have an excellent combination of toughness and flexibility. Useful polysulfones are sold under trade names such as "P-1700", and "P-3500" by Union Carbide, both commercial products having a linear chain of the general formula

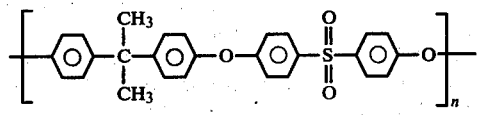

where n, representing the degree of polymerization, is about 50 to 80. Other useful polysulfones are sold under the trade name "ASTREL 360 Plastic" by the 3M Company. Poly(arylene ether) sulfones are often advantageous. Poly(arylene ether) sulfones having the structure

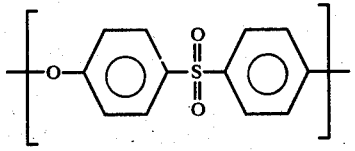

and available from ICI, Ltd., Great Britain, are also useful. Still other useful polysulfones could be prepared through polymer modifications, for example, by crosslinking, grafting, quaternization, and the like.

A preferred form for the membranes, especially anisotropic membranes, for fluid separations is a hollow fiber form. In making hollow fiber, e.g., anisotropic, membranes, a wide variety of spinning conditions may be employed. Particularly advantageous hollow fibers (or hollow filaments) of polysulfones, e.g., of P-3500 polysulfone produced by Union Carbide and polyether sulfones of ICI, Ltd., can be prepared by spinning the polysulfone in a solution comprised of solvent for the polysulfone. Typical solvents are dimethylsulfoxide, dimethylformamide, dimethylacetamide and N-methylpyrrolidone. The weight percent polymer in the solution may vary widely but is sufficient to provide a hollow fiber under the spinning conditions. Often, the weight percent of polymer in the solution is about 15 to 50, e.g., about 20 to 35. If the polysulfone and/or solvent contain contaminants, such as water, particulates, etc., the amount of contaminants should be sufficiently low to permit spinning. If necessary, contaminants can be removed from the polysulfone and/or solvent. The size of the spinning jet will vary with the desired inside and outside diameters of the product hollow filament. One class of spinning jets may have orifice diameters of about 15 to 35 mils and pin diameters of about 5 to 15 mils with an injection capillary within the pin. The diameter of injection capillary may vary within the limits established by the pin. The spinning solution is frequently maintained under a substantially inert atmosphere to prevent contamination and/or coagulation of the polysulfone prior to spinning and to avoid undue fire risks with volatile and flammable solvents. A convenient atmosphere is dry nitrogen.

The spinning may be conducted using a wet jet or dry jet technique, i.e., the jet may be in or removed from the coagulating bath. The wet jet technique is often used for the sake of convenience. The spinning conditions are preferably not such that the filament is unduly stretched. Frequently, spinning speeds are within the range of about 5 to 100 meters per minute although higher spinning speeds can be employed prividing the filament is not unduly stretched and sufficient residence time is provided in the coagulation bath. Any essentially nonsolvent for the polysulfone can be employed for the coagulation bath. Conveniently, water is employed as the primary material in the coagulation bath. A fluid is commonly injected into the inside of the fiber. The fluid may comprise, e.g., air, isopropanol, water, or the like. The residence time for the spun fiber in the coagulation bath is at least sufficient to ensure solidification of the filament. The temperature of the coagulation bath may also vary widely, e.g., from $-15°$ to $90°$ C. or more, and is most often about $1°$ to $35°$ C., say, about $2°$ to $8°$ or $10°$ C. The coagulated hollow fiber is desirably washed with water to remove solvent.

After storage in water in accordance with this invention the membranes exhibit improved selectivities of fluid separations. It has been found that the improvements in selectivity of fluid separations can also be observed when the membranes are coated with a material which material does not significantly effect the fluid separations but is in occluding contact with a barrier layer of the membrane such that proportion of permeating fluid passing through the material of the membrane to the permeating fluid passing through the pores is increased with respect to that proportion in the uncoated membrane.

The coating may be in the form of an essentially non-interrupted membrane, i.e., an essentially non-porous membrane, in contact with the membrane, or the coating may be discontinuous, or interrupted. When the coating is interrupted, it is sometimes referred to as an occluding material since it may occlude channels for fluid flow, i.e., pores. Preferably, the coating is not so thick as to adversely affect the performance of the membrane, e.g., by causing an undue decrease in flux or by causing such a resistance to fluid flow that the selectivity of fluid separations of the membrane is essentially that of the coating. Often the coating may have an average thickness of up to about 50 microns. When the coating is interrupted, of course, there may be areas having no coating material. The coating may often have an average thickness ranging from about 0.0001 to 50 microns. In some instances, the average thickness of the coating is less than about 1 micron, and may even be less than about 0.5 micron. The coating may comprise one layer or at least two separate layers which may or may not be of the same materials.

While any suitable method can be employed, the method by which the coating is applied to the membranes can have some bearing on the performance of the membranes. Typical methods for applying the coating include coating operations such as spraying, brushing, immersion in an essentially liquid substance containing the material of the coating, and the like. The material of the coating is preferably applied to the membranes as an essentially liquid substance and may be in a solution with a solvent which is substantially a non-solvent for the material of the membrane. If the essentially liquid substance comprises polymerizable material, the polymerizable material is advantageously polymerized after application to the membrane. The integrity of the coating and the performance of the membrane for fluid separations may be enhanced by subjecting the opposite side of the membrane to a lower absolute pressure during the coating operation.

Particularly advantageous materials for the coating have relatively high permeability constants for fluids such that the presence of the coating does not unduly reduce the flux of the membranes. Suitable materials for the coating should be capable of providing occluding contact with the membrane. For instance, when applied it should sufficiently wet and adhere to the membrane to enable occluding contact to occur. Moreover, based on estimates of the cross-sectional pore diameters through the barrier layer of the membrane, materials which may be particularly advantageous for the coating can be chosen. The molecular size of the material of the coating is preferably not too large to be accommodated by the pores of the membrane, but is not too small such that it can be drawn through the pores during coating and/or fluid separation operations.

The materials for the coating may be natural or synthetic substances, and are often polymers, and advantageously exhibit the appropriate properties to provide occluding contact with the porous separation membrane. Synthetic substances include both additional and condensation polymers. Typical of the useful materials which can comprise the coating are polymers which can be substituted or unsubstituted, and which are solid or liquid under gas separation conditions. The materials include synthetic rubbers; natural rubbers; relatively high molecular weight and/or high boiling liquids; organic prepolymers; poly (siloxanes) (silicone polymers); polysilazanes; polyurethanes; poly(epichlorhydrin); polyamines; polyimines; polyamides; acrylonitrile-containing copolymers such as poly(α-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; terpinoid resins; linseed oil; cellulosic polymers; polysulfones, especially aliphatic-containing polysulfones; poly(alkylene glycols) such as poly(ethylene glycol), poly(propylene glycol), etc.; poly(alkylene) polysulfates; polypyrrolidones; polymers from monomers having α-olefinic unsaturation such as poly(olefins) (e.g., poly(ethylene), poly(propylene), poly(butadiene), poly(2,3-dichlorobutadiene), poly(isoprene), poly(chloroprene)) poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly(methylvinylketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly(xylylene oxide); polycarbonates; polyphosphates, e.g., poly(ethylenemethylphosphate); and the like, and any interpolymers including block interpolymers containing repeating units from the above, and grafts and blends containing any of the foregoing. The polymers may or may not be polymerized after application to the membrane.

Particularly useful materials for coatings comprise poly(siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1000. Often, the poly(siloxanes) have a molecular weight of about 1,000 to 300,000 when applied to the porous separation membrane. Common aliphatic and aromatic poly(siloxanes) include the poly(monosubstituted or disubstituted siloxanes), e.g., wherein the substituents are lower aliphatic, for instance, lower alkyl, including cycloalkyl, especially methyl, ethyl, and propyl, lower alkoxy; aryl including mono or bicyclic aryl including bis phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups and the like. The poly(siloxane) may be cross-linked in the presence of a cross-linking agent to provide a silicone rubber, and the poly(siloxane) may be a copolymer with a cross-linkable comonomer such as α-methylstyrene to assist in the cross-linking. Typical catalysts to promote cross-linking include the organic and inorganic peroxides. Cross-linking may occur prior to application of the poly(siloxane) to the porous separation membrane, but preferably at least a major portion of the cross-linking occurs after the poly (siloxane) is applied to the membrane. Frequently, the poly(siloxane) has a molecular weight of 1,000 to 100,000 prior to cross-linking. Particularly advantageous poly (siloxanes) comprise poly(dimethylsiloxane), poly(phenylmethylsiloxane), poly(trifluoropropylmethylsiloxane), copolymer of α-methylstyrene and dimethylsiloxane, and post-cured poly(dimethylsiloxane)-containing silicone rubber having a molecular weight of about 1,000 to 50,000 prior to cross-linking. Some poly(siloxanes) do not sufficiently wet a polysulfone membrane to provide as much occluding contact as is desired. However, dissolving or dispersing the poly(siloxane) in a solvent which does not substantially affect the polysulfone can facilitate obtaining occluding contact. Suitable solvents include normally liquid alkanes, e.g., pentane, cyclohexane, etc.; aliphatic alcohols, e.g., methanol; some halogenated alkanes; and dialkyl ethers; and the like; and mixtures thereof.

The following examples are intended to further illustrate the invention but are not in limitation thereof. All parts and percentages of solids and liquids are by weight, and all parts and percentages of gases are by volume, unless otherwise indicated.

EXAMPLE 1

This example illustrates a procedure for making an anisotropic membrane in hollow fiber form utilizing polysulfone polymer (P-3500 available from Union Carbide). The polysulfone is dried at 100° C. at 125 mm. of mercury pressure for about 25 hours. The dried polysulfone is admixed at a temperature of about 65° to 70° C. with dimethylacetamide (moisture content less than about 0.1 weight percent) to provide a solution containing 27.5 weight percent polysulfone. The solution is transported to a holding tank having a nitrogen atmosphere at about 1.4 kilograms per square centimeter. The solution is not heated while in the holding tank and thus can cool to ambient temperature.

The polymer solution is pumped from the holding tank to a hollow fiber spinnerette which is immersed in an aqueous bath at a temperature of about 4° C. The spinnerette has an outer orifice diameter of 0.0559 cm, an inner pin of 0.0229 cm and an injection orifice in the pin of 0.0127 cm. The polymer solution is pumped and metered to the spinnerette at a rate of about 7.2 milliliters per minute and is drawn from the spinnerette at a rate of about 33 meters per minute. The polymer solution coagulates in the form of a hollow fiber upon contacting the aqueous bath. Through the injection orifice of the spinnerette is provided distilled water to coagulate the inside of the hollow fiber. The fiber passes through the aqueous bath for a distance of about one meter. A quantity of the aqueous bath is continuously purged to maintain a dimethylacetamide concentration of less than about 4 weight percent in the bath.

The fiber is then immersed in a second aqueous bath which is maintained at a temperature of about 4° C. for a distance of about five meters. Upon leaving the second aqueous bath the fiber contains some dimethylacetamide.

The fiber from the second aqueous bath is immersed in two additional aqueous baths at room temperature, each for a distance of above five meters, and the fiber is wound on a bobbin under only sufficient tension to effect the winding. The fiber is maintained wet with water during winding.

EXAMPLE 2

The procedure of Example 1 is substantially repeated four times to prepare four bobbins of anisotropic, polysulfone hollow fiber. The bobbins, before drying, are placed into vats filled with tap water obtained from the City of Durham, N.C., such that the bobbins are completely immersed. The temperature of the vats are maintained at ambient laboratory temperatures, i.e., about 20° C. After 1, 4, 7, 20 and 27 days samples of the fibers are taken from the bobbins at the lead ends and analyzed for dimethylacetamide (DMAc) and water content and for permeabilities of hydrogen and carbon monoxide. The ratio of the permeability of that membrane to carbon monoxide is calculated to provide the separation factor of that membrane for hydrogen over carbon monoxide. In each of the determinations of the permeabilities, the membrane is rinsed to remove deposits and dried at ambient laboratory conditions, e.g., about 20° to 25° C. and about 40 to 60 percent relative humidity for about one day. The dried fibers are assembled in a looped bundle of twenty fibers to provide approximately 45 square centimenters of surface area and are coated by immersion in a solution of 10 weight percent Sylgard 184 (a dimethylsiloxane-containing silicone rubber prepolymer available from Dow Corning) in isopentane, followed by curing at about 40° to 50° in an ambient atmosphere. The results of the analysis are presented in Table I.

TABLE I

| Day | Bundle 1 | 2 | 3 | 4 |
|---|---|---|---|---|
| | $H_2O$ Level (%) | | | |
| 1 | 0.7 | 0.77 | 0.78 | 0.65 |
| 4 | 0.76 | 0.66 | 1.1 | 1.48 |
| 7 | 0.56 | 0.74 | 0.76 | 1.1 |
| 20 | 1.66 | 0.68 | 0.76 | 0.65 |
| 27 | 0.87 | 0.78 | 0.87 | 0.67 |
| | DMAc Level (%) | | | |
| 1 | 0.82 | 0.91 | 1.26 | 1.38 |
| 4 | 0.76 | 0.76 | 1.60 | 1.62 |
| 7 | 0.93 | 1.04 | 1.58 | 1.55 |
| 20 | 1.54 | 1.4 | 1.20 | 1.2 |
| 27 | 0.8 | 0.91 | 1.12 | 1.09 |
| | $H_2$ Permeability* | | | |
| 1 | 89 | 92 | 98 | 85 |
| 4 | 83 | 92 | 93 | 83 |
| 7 | 93 | 97 | 85 | 77 |
| 20 | 90 | 94 | 85 | 82 |
| 27 | 81 | 87 | 90 | 88 |
| | Separation Factor for $H_2$ Over CO | | | |
| 1 | 21.6 | 24.4 | 25.5 | 26.3 |
| 4 | 23.4 | 23.9 | 27.4 | 27.9 |
| 7 | 26.7 | 27.4 | 27.3 | 26.0 |
| 20 | 26.1 | 26.8 | 31.9 | 32.9 |
| 27 | 28.4 | 33.0 | 31.3 | 32.0 |

*$cm^3/cm^2$-sec-cmHg $\times 10^6$

EXAMPLE 3

The procedure of Examples 1 and 2 is essentially repeated except that the bundles are stored under varying conditions including the presence and absence of biocides. The first bundle is stored in the presence of 2 grams per daily addition of calcium hypochlorite. The second bundle is stored in the presence of 312 grams of household bleach (about 5 percent sodium hypochlorite). The third bundle is stored only in tap water from the City of Durham, N.C. The fourth bundle is stored in tap water as the third bundle except that air is bubbled through the water. The fifth bundle is stored in the presence of 3 weight percent formaldehyde. The sixth bundle is stored in water obtained for a preceding storage conducted essentially the same as the procedure employed with the third bundle. All bundles are stored under essentially the same conditions of temperature, light, and the like for about 21 days. No evidence of microorganism growth is observed in the storage of bundles one, two and five which contain the biocide. In the storage media for bundles three and six, microorganism growth is evident, and in the storage media for bundle four, the microorganism growth is extremely heavy. As in Example 2, the samples are rinsed to remove deposits prior to drying. The fiber samples are taken from both the lead and tail ends of the bundle. The fibers are analyzed for coated and uncoated permeabilities of hydrogen and carbon monoxide, and the results are provided in Table II. A group of sixteen fiber samples is employed for each determination and the average is reported except for the results pertaining to the tails of bobbin number 2 wherein only fifteen fiber samples are employed.

TABLE II

| Bundle Number | Heads | | | | | | Tails | | | | | |
|---|---|---|---|---|---|---|---|---|---|---|---|---|
| | Uncoated | | | Coated | | | Uncoated | | | Coated | | |
| | (P/l)CO* | (P/l)H₂** | H₂*** αCO | (P/l)CO | (P/l)H₂ | H₂ αCO | (P/l)H₂ | αCO | H₂ (P/l)CO (P/l)H₂ | | αCO | H₂ |
| 1 Calcium Hypochlorite (Control) | 88.6 (13.5)+ | 357 (55.1) | 4.02 (.09) | 1.57 (/27) | 55.5 (5.58) | 36.1 (5.47) | 108 (40.7) | 417 (145) | 3.90 (.18) | 2.14 (.55) | 63.0 (10.1) | 30.2 (3.46) |
| 2 Sodium Hypochlorite (Control) | 95.6 (23.3) | 379 (92.1) | 3.99 (.123) | 2.41 (.36) | 64.5 (5.76) | 27.2 (3.86) | 104 (29.1) | 404 (111) | 3.90 (.07) | 2.60 (.55) | 64.1 (7.09) | 25.4 (4.67) |
| 3 Tap Water | 73.3 (12.5) | 317 (45.5) | 4.33 (.176) | 1.79 (.25) | 59.1 (6.48) | 33.2 (1.54) | 94.7 (20.2) | 377 (70.4) | 4.00 (.142) | 2.43 (.37) | 67.7 (6.52) | 28.2 (2.72) |
| 4 Aerated Tap Water | 23.3 (4.43) | 94.3 (18.3) | 4.05 (.164) | .38 (.09) | 11.3 (3.0) | 30.0 (6.6) | 47.2 (7.44) | 223 (29.3) | 4.74 (.26) | 1.27 (.21) | 52.0 (8.97) | 41.1 (3.64) |
| 5 Formaldehyde (Control) | 79.8 (8.78) | 332 (40) | 4.15 (.13) | 2.15 (.22) | 69.9 (7.99) | 32.6 (3.87) | 112 (29.6) | 426 (111) | 3.82 (.14) | 1.95 (.21) | 55.6 (7.22) | 28.6 (3.57) |
| 6 Storage Medium | 53.0 (12.5) | 237 (45.6) | 4.52 (.24) | 1.43 (.16) | 50.7 (5.14) | 36.0 (2.27) | 66.0 (14.3) | 283 (58) | 4.29 (.11) | 1.46 (.13) | 53.4 (4.70) | 36.6 (2.42) |

*Permeability of Carbon Monoxide, cc/cm²-sec-cmHg
**Permeability of Hydrogen, cc/cm²-sec-cmHg
***Separation Factor of Hydrogen Over Carbon Monoxide
+Standard Deviation

EXAMPLE 4

The procedure of Example 1 is essentially followed to prepare three polymer solutions for spinning and six different fibers. The first polymer solution contained about 28 weight percent polymer; the second, about 24 weight percent polymer; and the third, about 27 weight percent polymer. Each of the polymer solutions is spun at speeds of about 20 and 33 meters per minute (feed rates of about 4.8 and 7.2 milliliters per minute) to provide the six samples. The separation factors of the samples for oxygen over nitrogen is determined originally and after storage in water as in Example 2. The results are provided in Table III.

TABLE III

| | Separation factor, Oxygen over Nitrogen | | Number of Days Stored |
|---|---|---|---|
| | Original | Stored | |
| First Polymer Solution | | | |
| 20 Meters per Minute | 3.1 | 3.8 | 14 |
| 33 Meters per Minute | 2.1, 2.3 | 5.1, 4.7 | 14 |
| Second Polymer Solution | | | |
| 20 Meters per Minute | 2.6 | 3.7 | 16 |
| 33 Meters per Minute | 2.8, 3.7 | 4.6, 4.6 | 16 |
| Third Polymer Solution | | | |
| 20 Meters per Minute | 3.1 | 3.8 | 13 |
| 33 Meters per Minute | 4.4, 4.7 | 4.4, 4.7 | 13 |

It is claimed:

1. A method for enhancing the selectivity for fluid separation of a membrane in which the material of the membrane significantly effects the fluid separation, said membrane having a barrier layer with pores therethrough which adversely affect the selectivity of fluid separation and said membrane being resistant to biodegradation, comprising storing the membrane in an aqueous medium having an essential absence of a bacteriostat for a time sufficient to provide growths of microorganisms and thus enhance the selectivity of fluid separation of the membrane.

2. The method of claim 1 wherein the aqueous medium is at a temperature of about 10° to 40° C. and the membrane is stored for at least about one day.

3. The method of claim 2 wherein the aqueous medium has been used for storing membranes.

4. The method of claim 2 wherein the aqueous medium is aerated.

5. The method of claim 2 wherein the growth of microorganisms on the membrane is arrested after the storage of the membrane.

6. The method of claim 2 wherein the membrane is dried after the storage.

7. The method of claim 2 wherein the aqueous medium is inoculated with microorganisms suitable for enhancing the selectivity of separation of the membrane.

8. The method of claim 7 wherein the aqueous medium has been used for storing membranes.

9. The method of claim 7 wherein the aqueous medium is aerated.

10. The method of claim 7 wherein the growth of microorganisms on the membrane is arrested after the storage of the membrane.

11. The method of claim 7 wherein the membrane is dried after the storage.

12. The method of claim 2 wherein the membrane is anisotropic and the barrier layer of the anisotropic membrane is thin.

13. The method of claim 12 wherein the membrane is an anisotropic membrane which is formed by coagulation from a solvent solution.

14. The method of claim 13 wherein the anisotropic membrane comprises polysulfone.

15. The method of claim 14 wherein the polysulfone has the repeating structural unit

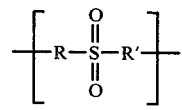

wherein R and R' can be the same or different and are aliphatic or aromatic hydrocarbyl-containing moieties of 1 to about 40 carbon atoms, and the polysulfone has an average molecular weight of at least about 10,000.

16. The method of claim 15 wherein the solvent for the polymer solution for coagulation comprises at least one of dimethylformamide, dimethylacetamide, dimethylpropionamide, and N-methylpyrrolidone.

17. The method of claim 16 wherein the membrane exhibits selectivities of fluid separation characteristic of fluid separation by Knudsen diffusion or by a combination of Knudsen diffusion and separation by interaction with the material of the membrane.

18. The method of claim 16 wherein the aqueous medium is inoculated with microorganisms suitable for enhancing the selectivity of separation of the membrane.

19. The method of claim 18 wherein the aqueous medium has been used for storing membranes.

20. The method of claim 18 wherein the aqueous medium is aerated.

21. The method of claim 18 wherein the growth of microorganisms on the membrane is arrested after the storage of the membrane.

22. The method of claim 18 wherein the membrane is dried after the storage.

23. The method of claim 12 wherein the membrane comprises polysulfone.

24. The method of claim 12 wherein the ratio of total surface area of the membrane to total pore cross-sectional area through the barrier layer is at least about $10^3:1$ and the average pore cross-sectional diameter is less than about 1000 angstroms.

25. The method of claim 24 wherein the membrane exhibits selectivities of fluid separation characteristic of fluid separation by Knudsen diffusion or by a combination of Knudsen diffusion and separation by interaction with the material of the membrane.

* * * * *